April 2, 1968 R. HÜBNER 3,375,700
PORTABLE GAS ANALYZER FOR TESTING SUBTERRANEAN
AMBIENT AIR SAMPLES
Filed Jan. 21, 1965 2 Sheets-Sheet 1

Rolf Hübner
INVENTOR.

BY Karl F. Ross
AGENT

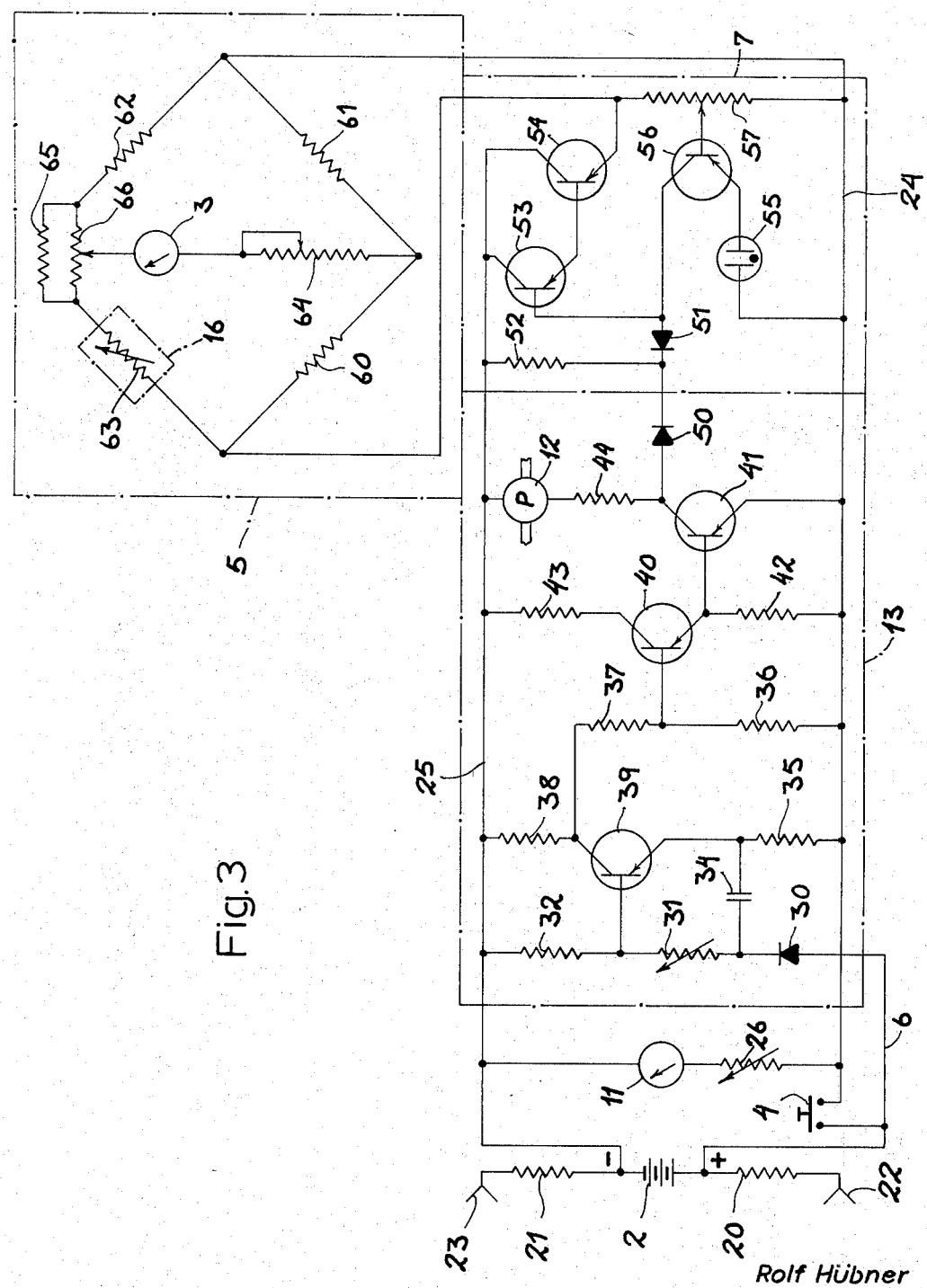

United States Patent Office 3,375,700
Patented Apr. 2, 1968

3,375,700
PORTABLE GAS ANALYZER FOR TESTING SUBTERRANEAN AMBIENT AIR SAMPLES
Rolf Hübner, Gabelsbergerstr. 31, Dortmund, Germany
Filed Jan. 21, 1965, Ser. No. 427,047
Claims priority, application Germany, Jan. 21, 1964, H 51,453
8 Claims. (Cl. 73—23)

ABSTRACT OF THE DISCLOSURE

A portable gas analyzer for testing the atmosphere in mines and other subterranean chambers which includes a gas aspirator for drawing ambient gases into the analyzer, a conductivity-type sensor responsive to the concentration of components of the gas and connected with an electrical indicator for displaying this concentration, an electronic transistor timing circuit energizing the aspirator for a predetermined operating period and thereafter, during continued operation of a manual switch, connecting the indicator to the source.

---

My present invention relates to a portable gas analyzer for the detection and measurement of noxious gaseous components in an underground atmosphere or similar environments where certain gases, such as methane, carbon dioxide and carbon monoxide, are injurious to health and/or constitute an explosion hazard. Instruments of this type have been disclosed, for example, in my copending applications Ser. No. 412,120, filed Nov. 18, 1964 (Patent No. 3,255,663), and Ser. Nos. 416,655 and 416,653, both filed Dec. 7, 1964 and since issued as U.S. Patents No. 3,266,293 and 3,276,241.

Instruments for the detection and measurement of the aforementioned gaseous constituents generally possess one or more testing circuits with appropriate sensors for the ascertainment of certain physical properties (e.g. thermal conductivity or electrical resistance or capacitance) of a gas sample admitted into a measuring chamber or conducted through a tubular probe. A suitable indicator such as a voltmeter, responsive to the output of the sensor or sensors, is included within the instrument to provide audible and/or visual interpretation of the developed electrical signal which is indicative of gas type and concentration. To facilitate automatic operation, the instrument may also include a pump for aspirating a sample of ambient atmosphere into the test passage just prior to or concurrently with the indicator readout. All these elements of a portable gas analyzer are powered normally by a primary or secondary battery housed within the instrument, since electrical mains are usually unavailable in mines or other subterranean tunnels and chambers.

During the operation of a gas analyzer of this type, or upon extended storage in a standby status, the battery becomes partially or wholly discharged. A potentiometer, rheostat or similar circuit element is usually provided to permit adjustment of the effective battery potential to a certain reference value indicated by a mark on a meter scale. Should the meter pointer fall below this reference mark, the potentiometer is subsequently reset until the pointer is again aligned with the mark. Failure of the pointer to reach this scale value indicates insufficient battery voltage necessitating either a recharge or a replacement of the power pack.

Various disadvantages are inherent in this method of adjusting a measuring circuit to compensate for changes in the terminal voltage of a battery. Thus, the voltage check is generally made with the same meter that is employed for the readouts of gas concentrations. Consequently, errors may be introduced in a gas determination if a battery-testing switch is actuated instead of a switch for analyzing a gas. In the dim lighting of mines and comparable subterranean chambers, this probability of error is always present, especially if a plurality of switches are provided on the instrument panel. Moreover, the meter pointer can always be aligned with a scale index through manipulation of a potentiometer or rheostat unless the battery is completely exhausted, yet no indication is given of the state of charge of the battery. By the same token, there is no information conveyed to the user on the number of further gas tests which may be conducted on the remaining battery charge. Finally, the adjustment of a mechanically variable resistor may cause spurious electrical interference which can introduce transients detrimental to the sensitive gas-detection elements contained within the instrument.

It is the general object of my present invention to provide an instrument for analyzing an ambient atmosphere in which the aforestated drawbacks are avoided.

It is a more particular object of my invention to provide an instrument of this type in which the input voltage of the gas-concentration indicator is automatically maintained at a predetermined reference value as long as the terminal voltage of the battery remains within operative limits, thereby eliminating the need for manual resetting of an adjustable resistance element.

It is a further object of my invention to provide an instrument of simple and foolproof mode of operation wherein the initiation of a gas-testing cycle and a determination of the battery condition are effected concurrently by the actuation of a single switch, the two readings being displayed on separate indicators to minimize the risk of error.

It is another object of my invention to provide an instrument of this character wherein the state of charge of a battery is displayed upon an indicator scale suitably marked to show the number of tests which may still be run on the remaining battery charge.

The stability of the voltage supply in an instrument of this type is critical, of course, only for the meter reading but not for the operation of a forced-circulation device, such as a suction pump, which in an automatic system must be actuated concurrently with such reading or just prior thereto. The energization of the pump, on the other hand, involves a considerably larger drain on the battery than the operation of a voltmeter-type indicator, hence a feature of my invention resides in the provision of three distinct networks including a power network for the circulation means, a measuring network (e.g. a bridge circuit) for the main indicator and a voltage-stabilizing network inserted between the measuring network and the common power supply. An auxiliary indicator, connected to show the actual terminal voltage of a battery serving as the power source, is connected across the latter ahead of the stabilizing network and, advantageously, is calibrated directly in terms of number of tests still available with the existing battery charge; to this end it is necessary to design part of the power network as a timing circuit which establishes a definite time interval during which current is drawn by the pump motor in the course of each test, reference in this connection being also made to my aforementioned application Ser. No. 416,655 which discloses such a timing circuit but wherein the operating period of the pump is adjustable for the analysis of different kinds of atmosphere.

My invention will be described in greater detail with reference to the accompanying drawing in which:

FIG. 3 is a circuit diagram of the instrument illustrated in FIG. 1.

Figure 1:
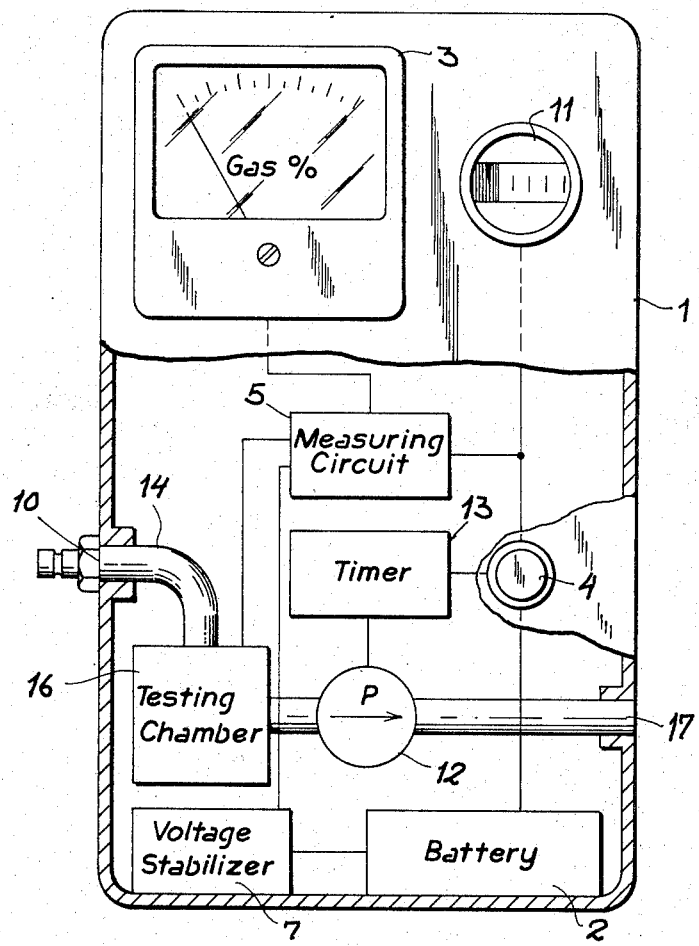
FIG. 1 is a front view (parts broken away) of a portable gas analyzer according to the invention.

The gas-analyzing instrument shown in FIG. 1 comprises a housing 1 with a window for the face of a principal meter 3 calibrated to indicate the percentages of certain noxious constituents (e.g. methane) in the ambient atmosphere which is to be tested. An auxiliary meter 11 next to meter 3 indicates the state of charge of a battery 2.

Depression of a pushbutton switch 4 on housing 1 closes a circuit to energize the meters 3 and 11. Additionally, the actuation of switch 4 energizes a sensor (not shown in this view), disposed within a measuring chamber 16, and furnishes a pulse to initiate aspiration of ambient gases by a pump 12 for a period of invariable length determined by a timing circuit 13. A small volume of ambient atmosphere is aspirated at an inlet 10 through a duct 14 into the measuring chamber 16 and is subsequently discharged at an exit port 17. The aspirated sample, during its retention in the measuring chamber 16, is analyzed by the sensor within that chamber, a signal voltage being thereby developed in an associated measuring circuit 5 for deflection of the pointer of meter 3. A voltage-stabilizing circuit 7 supplies the measuring circuit 5 with a regulated voltage free from any interfering transients.

Figure 2:
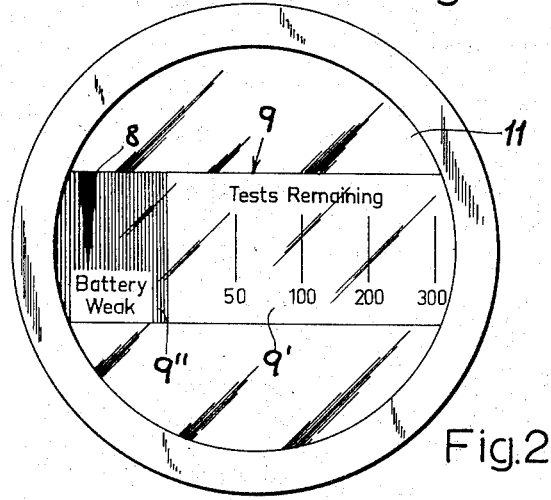
FIG. 2 is a detail view of an auxiliary indicator provided on the instrument of FIG. 1 to show the state of charge of the instrument battery.

FIG. 2 illustrates details of the meter 11 whose scale 9 is divided into two sections 9', 9". The meter may have a high-impedance moving-coil armature coupled with its pointer 8 for linear displacement of same across scale 9. The right-hand scale section 9' has markings calibrated to indicate the number of tests which may be run on the existing charge of the battery 2. The left-hand section 9", denoting exhaustion of the battery 2, is suitably colored (e.g. red) to warn the user of an insufficient supply voltage.

Reference will now be made to FIG. 3 for a description of the measuring, voltage-stabilizing and timing circuits 5, 7 and 13 indicated diagrammatically in FIG. 1. Circuit 5 comprises a bridge network with four resistive impedance arms 60, 61, 62 and 63 of which one, specifically the impedance arm 63, is constituted by the aforementioned sensor in testing chamber 16. A balancing resistor 66, shunted by a fixed resistor 65, is inserted between bridge arms 62, 63 and has a variable tap connected to the opposite corner via meter 3 in series with an adjustable calibrating resistor 64. The other bridge diagonal is connected across a pair of bus bars 24, 25 which, in the closed position of pushbutton switch 4, are tied to the positive and the negative terminal, respectively, of battery 2. These terminals are also permanently connected to respective jacks 22 and 23, via individual charging resistors 20 and 21, for coupling to an external power supply whenever the battery 2 is in need of recharging. The connection between negative bus bar 25 and battery 2 is permanent and independent of switch 4. Meter 11 is bridged across the two bus bars in series with a ballast resistor 26.

A lead 6 extends from the positive battery terminal to the base of a transistor 39 by way of a rectifier diode 30 and a variable resistor 31 which forms a voltage divider with a fixed resistor 32 connected between that base and bus 25. The emitter of this transistor is connected via a resistor 35 to bus bar 24 and via a condenser 34 to the junction of rectifier diode 30 with resistor 31. The collector of the transistor is returned to negative bus bar 25 through a resistor 38 and is further connected to positive bus bar 24 by way of a voltage divider composed of two series resistors 36, 37 whose junction is tied to the base of another transistor 40; the emitter and the collector of this latter transistor are energized from bus bars 24 and 25 through resistors 42 and 43, respectively. The emitter of transistor 40 is tied to the base of a further transistor 41 whose emitter leads directly to bus bar 24 and whose colletcor is connected to bus bar 25 via pump 12 in series with a resistor 44. Transistors 39, 40 and 41 are part of the power network 13 directly connected across source 2, transistors 39 and 40 constituting a two-stage timing circuit for the control of power transistor 41 and, therefore, of pump 12 without mechanical switching contacts.

Voltage-stabilizing network 7, inserted between power network 13 and measuring network 5, also includes three transistors 53, 54, 56. The base of transistor 53 is tied to the collector of transistor 56 and is further connected through a rectifier 51 and a resistor 52 to bus bar 25; the junction of the elements 51, 52 is connected to the collector of transistor 41 in network 13 via another rectifier 50. The collector-emitter circuit of transistor 54 is inserted in negative bus bar 25 beyond the junctions of the latter with resistor 52 and with the collector of transistor 53 whose emitter is directly tied to the base of transistor 54. A potentiometer 57, connected between bus bar 24 and the emitter of transistor 54 (and therefore also across the input diagonal of bridge network 5), has a slider joined to the base of transistor 56 whose collector is tied to the base of transistor 53 and whose emitter is connected to bus bar 24 via a constant-voltage device shown as a glow tube 55.

The operation of the system shown in FIG. 3 is as follows:

Normally, i.e. with switch 4 open but with the battery 2 delivering a suitable terminal voltage, condenser 34 is charged by way of rectifier diode 30 since the emitter of transistor 39 is virtually at collector potential; the transistor 39 is thus cut off, the same as all the other transistors which receive their emitter potential from disconnected bus bar 24. When switch 4 is closed, full battery voltage lies across the meter 11 which therefore operates to indicate the magnitude of that voltage and thereby the state of charge of battery 2. At the same time, condenser 34 discharges through resistor 35 at a rate determined by the time constant of circuit 34, 35, thus maintaining transistor 39 cut off for a predetermined period during which transistor 40 conducts and biases the base of transistor 41 negatively so that this transistor is also energized and pump 12 is operated. When the charge on condenser 34 has been sufficiently dissipated, transistor 39 becomes conductive and cuts off transistor 40 which, by virtue of its emitter-follower connection with transistor 41, also de-energizes the latter and disconnects the pump 12 from positive battery voltage.

Part of the current traversing the transistor 41 in its conductive state also flows through resistor 52 in series with diode 50 so that the base of transistor 53 and the collector of transistor 56 are both maintained at a relatively positive potential and the stabilizing network 7 open-circuits the input to bridge 5. When the pump 12 is de-energized, however, these two transistor electrodes go negative, tube 55 breaks down and the three transistors 53, 54, 56 conduct at a rate determined by the setting of potentiometer 57. Meter 3 then responds to indicate the degree of unbalance of the bridge as a result of the operation of sensor 63. When pushbutton 4 is subsequently released, the circuits return to normal.

During the stage of operation last described, i.e. with network 7 conducting, any decrease in the charge of battery 2 results in a reduction of current flow through potentiometer 57 so that transistor 56 becomes less highly conductive, the base of transistor 53 goes more negative and the conductivity of transistor 54 is increased so as substantially to balance the loss in terminal voltage. Since the voltage supplied to bridge circuit 5 is the one developed across potentiometer 57, this voltage remains substantially constant as long as conduction can be maintained through glow tube 55. When the battery voltage no longer suffices for this purpose, measuring circuit 5 is instantly de-energized so that no false reading can be had on meter 3; pointer 8 (FIG. 2) of meter 11 registers under these conditions with distinctively colored scale section 9".

The adjustability of resistor 31 permits selection of a suitable pumping interval, though such selection could evidently also be obtained through variation of the capacitance 34 and/or the resistance 35 of the time-constant circuit. Resistor 26 may be similarly adjustable to allow for recalibration of the meter 11, upon a change in the length of an operating cycle, in order that the deflection of its pointer may give the correct number of test cycles still available. Potentiometer 57 permits variation in the sensitivity of stabilizing circuit 7 whereas variable resistor 64 changes the reading of meter 3. All these adjustments may, of course, be properly correlated, e.g. mechanically or with the aid of co-ordinated reference markings at the respective control knobs, to adapt the instrument to a variety of operating conditions.

Naturally, the system described and illustrated admits of many modifications readily apparent to persons skilled in the art and intended to be embraced within the spirit and scope of my invention as defined in the appended claims.

I claim:

1. In a portable gas analyzer having electrically actuatable gas-aspirating means communicating with the ambient atmosphere, sensing means for the analysis of aspirated gas and electrical indicator means responsive to said sensing means, the combination therewith of a circuit arrangement including a power source subject to voltage variations, timer means operable when actuated to connect said source to said gas-aspirating means for energizing same over a predetermined operating period, manually operable switch means for actuating said timer means, and a measuring circuit jointly controlled by said switch means and said timer means for operatively connecting said indicator means to said source upon the de-energization of said timer means at the end of said predetermined operating period and during continued operation of said switch means.

2. In a portable gas analyzer having electrically actuatable gas-aspirating means communicating with the ambient atmosphere, sensing means for the analysis of aspirated gas and electrical indicator means responsive to said sensing means, the combination therewith of a circuit arrangement including a power source subject to voltage variations, timer means operable when actuated to connect said source to said gas-aspirating means for energizing same over a predetermined operating period, manually operable switch means for actuating said timer means, a measuring circuit jointly controlled by said switch means and said timer means for operatively connecting said indicator means to said source upon the de-energization of said timer means at the end of said predetermined operating period and during continued operation of said switch means, and a voltage-stabilizing circuit connected between said source and said indicator means.

3. In a portable gas analyzer having electrically actuatable gas-aspirating means communicating with the ambient atmosphere, sensing means for the analysis of aspirated gas and electrical indicator means responsive to said sensing means, the combination therewith of a circuit arrangement including an electric battery subject to voltage variations, timer means operable when actuated to connect said battery to said gas-aspirating means for energizing same over a predetermined operating period, manually operable switch means for actuating said timer means, a measuring circuit jointly controlled by said switch means and said timer means for operatively connecting said indicator means to said battery upon the de-energization of said timer means at the end of said predetermined operating period and during continued operation of said switch means, and a voltage-stabilizing circuit connected between said battery and said indicator means.

4. The combination defined in claim 3, further comprising a meter connectable directly across said battery by said switch means for indicating the terminal voltage of said battery.

5. The combination defined in claim 3 wherein said switch means has a single normally open pair of contacts.

6. The combination defined in claim 3 wherein said timer means comprises a two-stage transistor circuit having a time-constant network connected to the first stage thereof.

7. The combination defined in claim 6 wherein said time-constant network includes a condenser connected to be charged from said battery in the unoperated state of said switch means.

8. The combination defined in claim 3 wherein said voltage-stabilizing circuit includes constant-voltage means for deactivating said indicator means upon a decrease of the voltage of said battery below a predetermined limit.

References Cited

UNITED STATES PATENTS 2,720,108  10/1955  Johnson _____ 73—27

RICHARD C. QUEISSER, *Primary Examiner.*

J. GILL, *Examiner.*

C. I. McCLELLAND, *Assistant Examiner.*